Nov. 24, 1953 S. D. HARMAN 2,660,437

AUTOMATIC PHONOGRAPH

Filed June 30, 1947 3 Sheets-Sheet 1

INVENTOR
SLINGSBY D. HARMAN

BY

ATTORNEY

Nov. 24, 1953

S. D. HARMAN 2,660,437

AUTOMATIC PHONOGRAPH

Filed June 30, 1947

3 Sheets-Sheet 2

INVENTOR

SLINGSBY D. HARMAN

BY Paul L. Kiohu

ATTORNEY

Nov. 24, 1953 S. D. HARMAN 2,660,437

AUTOMATIC PHONOGRAPH

Filed June 30, 1947 3 Sheets-Sheet 3

INVENTOR
SLINGSBY D. HARMAN

BY Paul L. Kohe

ATTORNEY

Patented Nov. 24, 1953 2,660,437

UNITED STATES PATENT OFFICE 2,660,437

AUTOMATIC PHONOGRAPH

Slingsby D. Harman, Galesburg, Ill.

Application June 30, 1947, Serial No. 758,135

2 Claims. (Cl. 274—9)

This invention relates to improvements in automatic sound reproduction apparatus, and has particular reference to improvements in the tone arm support of the record-disc engaging stylus or needle mechanism, including a novel and effective provision for determining the initial position of the mechanism relative to the record-disc, the invention further including improved means for causing operation of the tone arm return mechanism upon completion of record sound reproduction.

A principal object of the invention is to provide a tone arm structure embodying a sound head and needle or stylus assembly, wherein the latter is supported on the tone arm in an improved manner, permitting positional movement of the sound head relative to the arm in record-engagement of the stylus, and affording an arrangement wherein the bearing pressure of the stylus on the record under sound reproduction, is determined solely by the weight of a major portion of the sound head assembly. Included in the sound head assembly according to present improvements, is a provision for adjusting the effective weight portion of the head, whereby the stylus bearing pressure may be correspondingly adjusted.

Another object is to provide means on the sound head adapted for cooperation with stop means disposed in the path of tone arm swing, for determining the initial, inoperative position of the tone arm structure, and an initial position of the sound head relative to the tone arm such as to dispose the stylus in substantial registry with the initial or needle-entering groove of the underlying record.

Another object is to provide in connection with a tone arm swingable horizontally over the record playing surface and so mounted as to be capable of pivotal movement in the vertical direction, of adjustable means for determining the operative elevation of the arm over the record in record play.

A further object is to provide a trip actuating means of electromagnetic character, effective in response to entering of the sound head stylus in the cut-off or trip groove of a record under play, to release the tone arm return mechanism for operation to swing the tone arm toward and into the aforesaid initial, inoperative position thereof. Trip mechanisms in prevailing use heretofore, are of mechanical character, and in actuation, result in an undesirable side thrust of the stylus against one side of the record grooves near the center of the record. Stylus vibrations are more frequent in such grooves, because of the increasingly shorter groove lengths leading to and terminating in the cut-off or trip groove. Hence the mechanical-trip-imposed side thrust of the stylus usually results in stylus cutting of the record particularly in the zone of the cut-off groove, with consequent damage to and reduction in the playing life of the record. The present provision of a sensitive, electromagnetic trip actuator, effectively eliminates all but an insignificant degree of side thrust imposition on the stylus, thereby contributing very materially to a longer playing life of records.

Other objects and advantages will appear readily from the following description of a preferred embodiment of the invention, as such is exemplified in the accompanying drawing, wherein.

Figure 2:
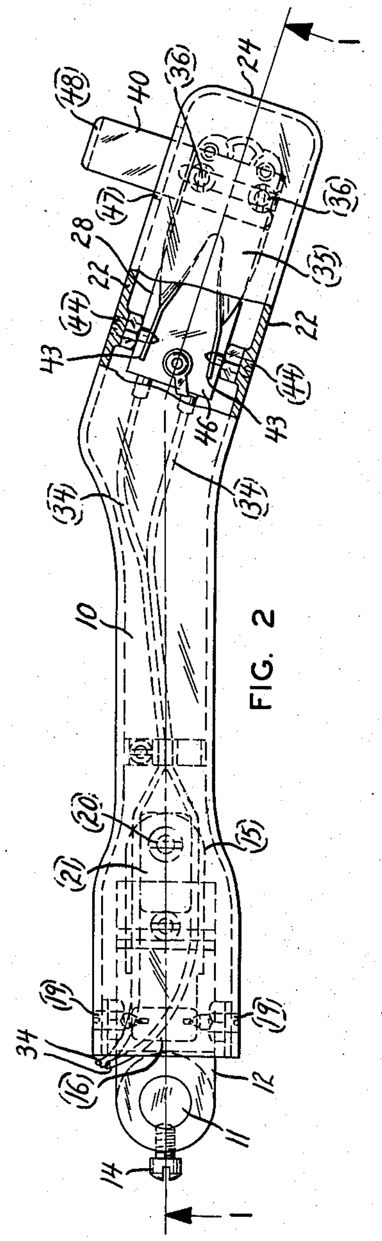
Fig. 2 is a top plan view of the tone arm structure, with part thereof broken away to illustrate the pivotal support of the pickup or sound head.
Figure 1:
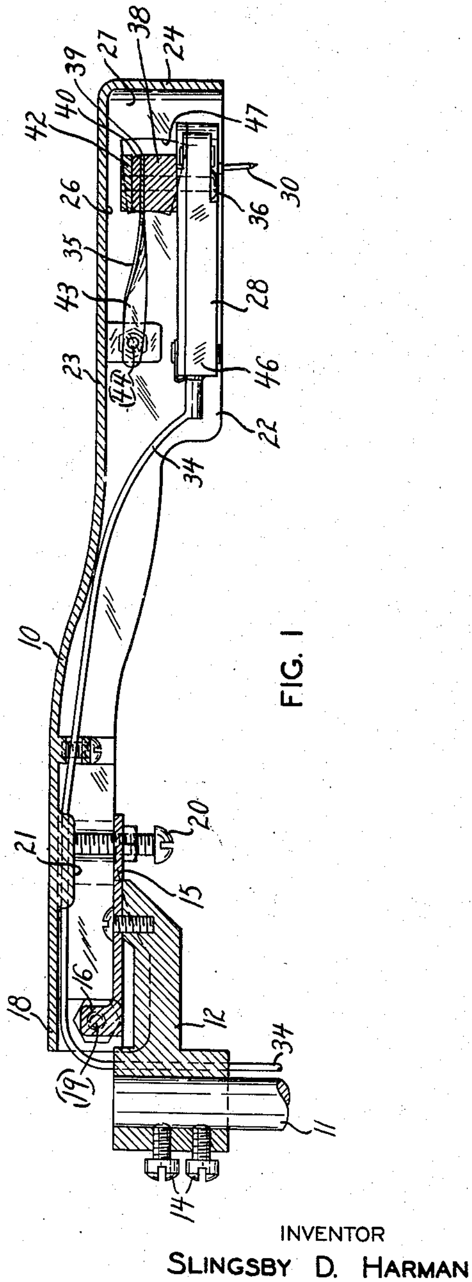
Fig. 1 is a longitudinal sectional view of a tone arm structure, showing certain features of the invention, the section being taken along the line 1—1 in Fig. 2.

With reference first to Figs. 1 and 2 of the drawing, illustrated is a tone arm 10 preferably of one-piece construction, which is carried at the upper end of a spindle 11 through a suitable bracket 12 fixed to the spindle as by the securing screws 14. Supported on bracket 12 is a plate member 15 provided with a lug 16 to which the end 18 of arm 10 is pivoted, as by the pivot screws 19, whereby to allow vertical pivotal displacement of the arm. An adjustable stop screw 20 on plate 15, abutting a boss 21 on arm 10, limits downward pivoting of the arm and serves to support the arm in its swing over the playing surface of a record, retaining the arm at a constant elevation with respect to the record under play, as may be determined by adjustment of screw 20. The arm preferably is of channel-form as shown, and provides downwardly extended skirt portions 22 at the opposite sides in the arm end section 23, and an end skirt 24. The skirts define with the top end wall 26 of the arm, a recess 27 opening beneath the arm end. In recess 27 is located a sound head 28 of conventional, electrical type, including a needle or stylus 30. Wires 34 lead from the sound head 28 rearwardly through the channel space of the arm, and thence to connection in the usual electrical circuit of the apparatus (not shown).

According to the present improvements, the sound head 28 is pivotally mounted in the arm recess 27 by means of a bracket element 35 of a suitable somewhat flexible material, preferably metallic. The bracket and sound head are attached by suitable screws 36, with the bracket spaced from the head by a block element 38 and having its end 39 clamped between the block and a member 40, the latter constituting a latch element as will appear presently. Screws 36 thread into a top plate 42, and when drawn up, securely clamp the bracket and members 38 and 40 to the head 28. Bracket 35 beyond its end 39, is of bifurcate form, affording arms 43 each apertured to receive the tip end of a pivot screw 44 threaded in the side skirt 22 of the tone arm. The sound head thus is pivoted to the arm, with the points of pivotal support located above and near the inner end 46 of the head, thereby affording an overhanging or eccentric pivotal arrangement of the head as for a purpose to appear.

As indicated in Figs. 1 and 2, the catch member or lock up finger 40 extends laterally of the arm through a slot 47 in one of the arm skirts 22, and terminates in a down-turned lip 48 (Fig. 5), the catch thus being adapted for cooperation with a stop and arm positioning member presently to be described.

It is to be pointed out here that the sound head pivoting bracket 35 by reason of its resiliency and the furcations or arms 43, serves to dampen shock transmission to the sound head. Moreover, the character of bracket shown, affords a desirable degree of self-adjustment in sound head assembly to the arm, and in the final assembly of the parts, allows a limited but desirable degree of both vertical and lateral or transverse play of the sound head in record play.

As appears in the drawing, the off-center or eccentric pivotal support of the sound head 28 effected as described, is determined thereby to be such that the major extent of the head on the needle side thereof, together with the bracket 35, members 38 and 42, and catch 40, are forwardly of the pivotal axis of the screws 44. The combined weight of these parts, acting under the force of gravity about the axis of screws 44, therefore determines the record-bearing pressure of the needle or stylus 30. Since the arm 10 engages and hence is supported by the stop screw 20 during record-playing movement of the arm, the arm weight is thus entirely removed from any additive effect on the record pressure of the needle. Consequently, needle pressure may be more readily determined at the desired value, and may be adjusted as circumstances or conditions demand, simply by substituting for the spacer block 38 shown, a smaller or larger block differing correspondingly in weight value. By this arrangement, there may be determined and maintained a minimum effective weight on the needle, to the end of reducing needle wear of the record to a minimum, with consequent prolongation of record life.

Figure 5:
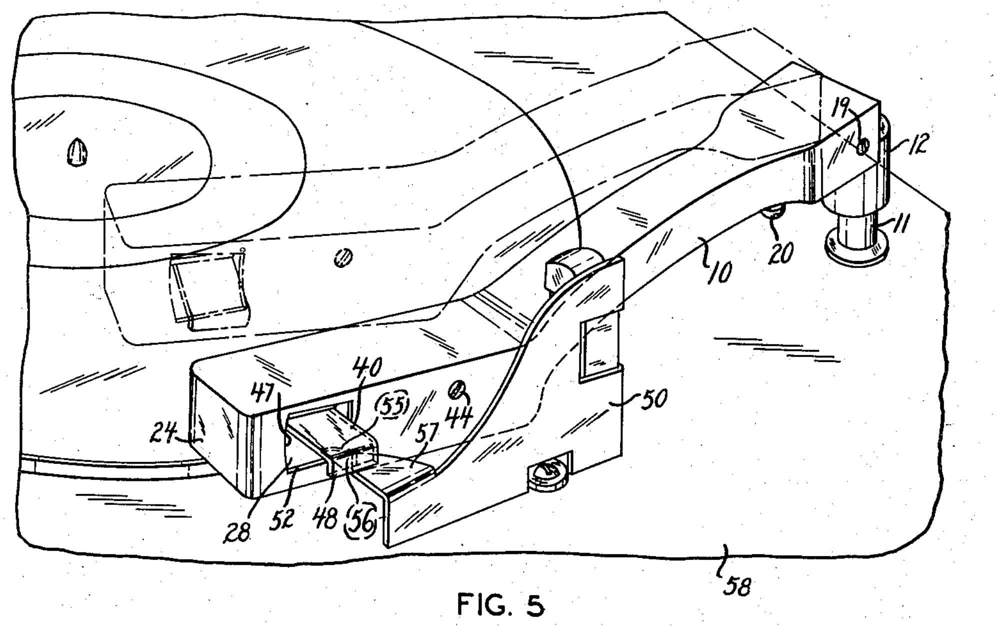
Fig. 5 is a view in perspective, of the tone arm assembly and stop means therefor, determining the initial, inoperative position of the arm.

Fig. 5 illustrates the tone arm assembly (solid line showing) in its initial, inactive position as determined by the catch 40 in cooperation with a stop member 50. It is to be pointed out here that following termination of record-playing, the record-supporting turn table is lowered away from the tone arm, while the tone arm assembly is returned or swung-back to its initial position, such displacement of these parts being accomplished by mechanism (not shown) of well known character, commonly employed for this purpose in automatic phonographs and the like. Lowering or drop-down of the turn table serves to separate the record from the stylus 30, whereupon the sound head assembly pivots downwardly until the catch 40 rests upon the lower margin 52 of the slot 47 in the tone arm. Now as the tone arm is swung to the position shown in Fig. 5, the down-turned lip 48 on catch 43, engages and rides up along a curved camming edge 55 of a flange 56 upstanding on the free end of an arm 57 on stop member 50, the lip 48 ultimately attaining and dropping behind the vertical edge of the flange 56. The catch in so moving over the cam edge 55 to the position shown, lifts the sound head from its lowermost position determined by resting of the catch 40 on the lower margin 52 of the tone arm slot 47, to a predetermined position of elevation in the tone arm recess 27. The stop member 50 is so positioned on the top panel or desk 58 of the apparatus, that when the tone arm is disposed in the initial position illustrated, the stylus 30 of the sound head 28, will be substantially in vertical alignment preferably with the first or needle-entering groove of the underlying record. Consequently, upon starting of record-playing operation of the apparatus, as the turn table rises to dispose a record in playing position, the record will engage the sound head stylus 30 in the first or entering groove of the record, and at the same time will pivotally elevate the sound head to a position wherein the catch lip 48 is clear of the camming flange 56. Thereafter, the tone arm is free to swing over the record playing surface as the stylus follows the spiralled sound groove of the record. Thus the catch and stop provision included in the present improvements, determines the initial positions of the tone arm and sound head thereof such that upon start of record playing, the stylus will engage in the entering groove of the record to be played, while the tone arm will be free from the stop through record lift of the sound head.

Figure 4:
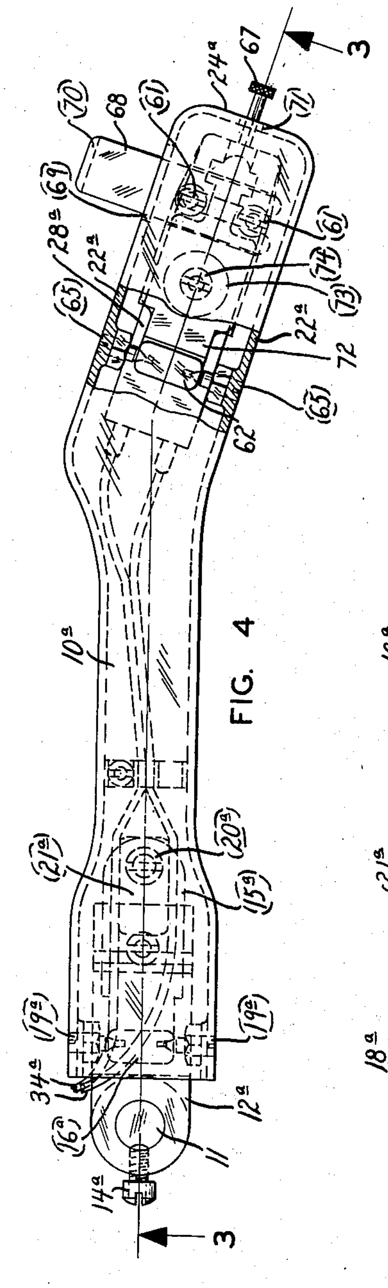
Figs. 3 and 4 are views similar to the views of Figs. 1 and 2, but illustrating a modified form of sound head support on the tone arm.
Figure 3:
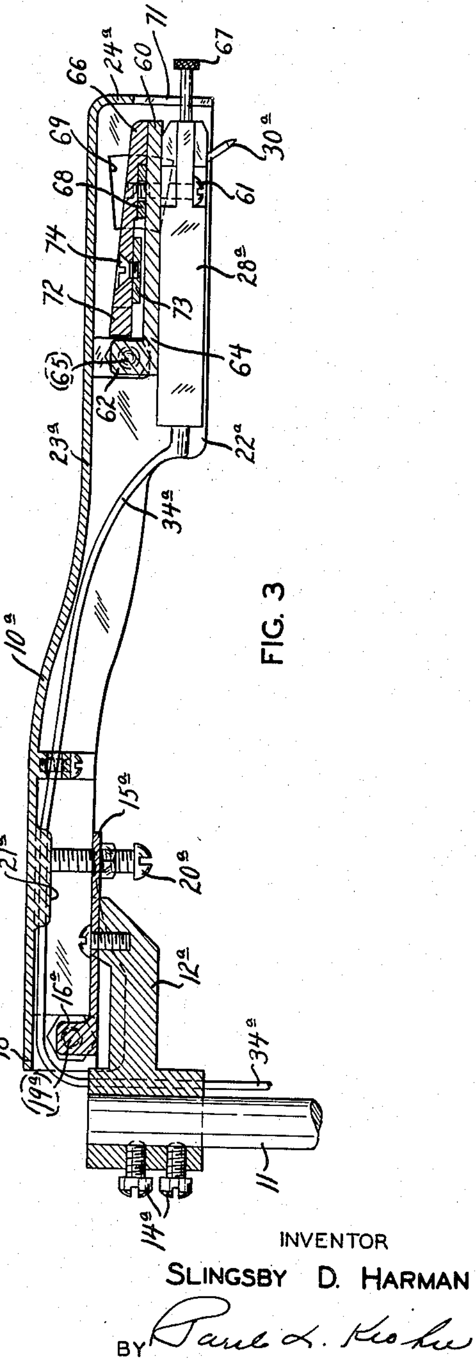

Figs. 3 and 4 illustrate a modification in the tone arm support of the sound head. In these views, all parts corresponding to those shown in Figs. 1 and 2, bear the same reference characters, differentiated, however, by the letter suffix *a*.

Sound head 28*a* is suitably attached to a plate element 60 by screws 61, and the plate in turn, is pivoted to the arm through a lug 62 at the free end 64 thereof, engaged by pivot screws 65 in the opposite arm skirts 22*a* (Fig. 4). A further plate-like element 66 and a catch or latch member 68 extending between plates 60 and 66, are held in assembly upon plate 60 by the screws 61, the screws threading into plate 66 and thereby serving to clamp the elements in place on the head 28*a*. Catch member 68 as in the first described embodiment, projects laterally of the arm through a slot 69 in one skirt 22*a*, and terminates in a lip 70 corresponding to the lip 48 of the catch shown in Fig. 5. In the embodiment shown, the stylus or needle 30*a* of head 28*a* may be retained in place by a set screw 67 manually accessible forwardly of the arm by extension thereof through a slot 71 in the arm flange or skirt 24*a*.

Plate 66 is extended in the portion 72, toward the pivot lug 62 of plate 60, and is spaced above plate 66 substantially to the extent shown. The plate extension 72 affords a support for a weight element 73 detachably carried thereon as by a screw 74.

The resulting off-center or eccentric pivotal support of the sound head is similar to that effected in the first described embodiment, and serves the same purpose. Moreover, the effective weight of the head assembly here may be adjusted readily, by substituting for the weight element 73, one or another of like elements differing in weight values.

In automatic phonographs generally, suitable mechanism is employed for freeing the record from the tone arm at the termination of record playing, as by lowering of the record turn-table, effecting a return swing of the tone arm to its initial, inactive position ready for further record-playing, and turning the record last played to its reverse side or introducing another record for play. The structural character and operation of such mechanism is well known, and hence is not here shown except by diagrammatic representation in Fig. 6, in respect to the part thereof serving to effect the return displacement of the tone arm to its initial position. During play of a record, the mechanism referred to, is held out of operation until released at the end of record play. The presently prevailing practice is to employ mechanical latch means for holding the mechanism out of action, and a latch trip of mechanical character, actuated from the tone arm spindle as the latter in its rotation consequent to the sound head needle folowing the record groove, approaches and attains an angular position determined by the needle reaching and entering the last or cut-off groove of the record under play. Since the tone arm movement during play is the result of needle-follow of the record groove, the force required to operate the mechanical latch trip is effected only by continuance of the needle in the record cut-off groove. This results in an appreciable frictional pressure of the needle against one side of the cut-off groove, with consequent wear of the groove side surfaces. In many instances, the groove wear becomes such that the trip action fails because of failure of the needle to enter and continue in the cut-off groove. In any event, the ultimate consequence of this is a greatly shortened life of the records played.

It is, therefore, one of the purposes of the present improvements to obviate the above stated condition attending the use of mechanically operated latch trip means, by providing a latch trip device of electromagnetic character, controlled by a sensitive switch. In the present example, closure of the switch to initiate operation of the electromagnetic trip, is effected through the tone arm spindle as the stylus of the sound head attains the record cut-off groove, the switch being so sensitive as to require but a slight pressure on its actuating element. Consequently, the side thrust of the needle or stylus against one side of the record cut-off groove, which obtains in switch actuation, is small and quite negligible insofar as any damaging effect thereof on the record groove is concerned.

Figure 6:
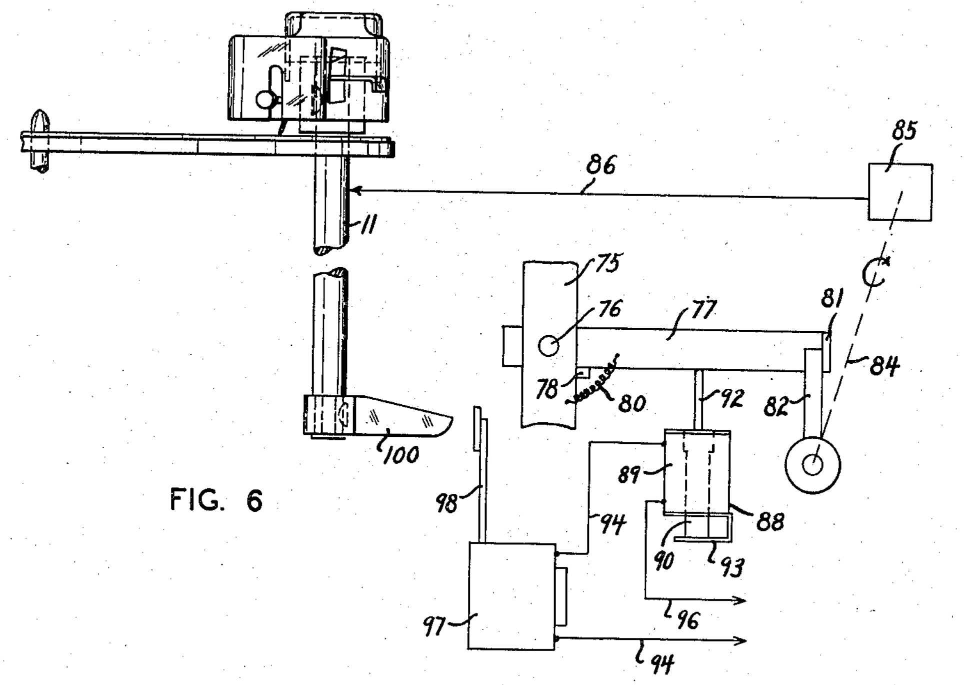
Fig. 6 is a largely diagrammatic view, illustrating the electromagnetic trip mechanism release provision of the invention.

With reference to Fig. 6, the frame of the apparatus is shown in fragmentary part at 75, and pivoted to the frame by pivot 76, is a latch trip member 77. Trip 77 normally rests against a stop 78 under the influence of a tension spring 80, and carries near its free end a projection or latch element 81 which in the position shown, is engaged by a complemental latch element 82. The latter is fixed on a shaft 84 (shown in broken lines) extending to mechanism indicated diagrammatically at 85. Mechanism 85 is of a conventional character generally employed in automatic phonographs to effect among other operations, return of the tone arm device to its initial position, through actuation of the tone arm spindle 11 by a suitable drive connection thereto as is indicated diagrammatically by the line 86. Mechanism 85 is, however, operable only upon release or tripping of the engaged latch elements 81 and 82, which as hereinbefore indicated, is effected following entering of the sound head needle in the record cut-off groove.

The presently improved means for actuating the trip member 77 to trip the latch elements 81 and 82, is found in an electromagnetic or solenoid device 88 suitably adjustably supported on a phonograph frame part (not shown), the device including an energizing coil 89 and an axially movable core or armature member 90. The armature supports a rod 92 extending toward the trip member 77, the rod preferably being adjustably threaded into the solenoid. In the de-energized condition of the solenoid, the armature occupies a lowered position against a bottom stop 93, thereby locating the upper end of rod 92 adjacently below the member 77, while the latter is against stop 78 and the latch elements are engaged. Electric current is supplied to the solenoid through leads 94 and 96, the lead 94 including a sensitive switch 97 of suitable construction, including a switch actuating arm 98. Switch 97 which may be carried by a bracket or other means mounted on the phonograph frame and capable of being adjustably positioned thereon, has its arm 98 extended into the path of an operating member or lever 100 fixed to and movable with the tone arm spindle 11. The switch position is such that as the spindle is rotated to a position corresponding with the location of the tone arm needle in the cut-off groove of a record under play, the lever 100 will engage and actuate switch arm 98 to close the supply circuit to the solenoid. Upon energization of the solenoid, the armature 90 responds by upward displacement to engage the rod 92 with the trip member 77, lifting the latter pivotally about the pivot 76 to disengage latch element 81 from the latch element 82. Mechanism 85 then is free for operation to return the tone arm to its initial, inoperative position, and otherwise to condition the phonograph mechanism for further record play.

It is to be noted here that following lift of the trip member 77 to disengage the latch elements, displacement of the tone arm by mechanism 85 toward the initial position of the arm, results in disengagement of lever 100 from the switch arm 98. As this occurs, the switch arm 98 returns under suitable bias (not shown) to normal switch-open position. Consequently, the solenoid is deenergized, and the trip member 77 returns to its initial position of rest against stop 78, under the action of return spring 80. Thereafter, as the mechanism 85 completes its function, the latch element 82 again abuts latch element 81 to stop the mechanism 85.

Since the switch 97 is of a sensitive character, only a slight pressure is necessary to be exerted by the spindle lever 100 on the switch arm 98, to effect switch closure. Hence, the present arrangement avoids all but a negligible side thrust of the needle on the side of the record cut-off groove, thus affording longer playing life of the records played.

Having now described the invention and the several advantages attained thereby, what I desire to claim and secure by Letters Patent is:

1. In an automatic phonograph for sound records of the disc type, wherein a record to be played is elevated to palying position and thence lowered at the termination of play, a tone arm assembly comprising an arm movable to and from an initial position, over the range of the playing surface of a record, a sound head structure including a record-engaging needle, means providing an off-center pivotal support of the sound head structure on the arm such that a major portion of the structure including the needle, is at one side of the pivotal axis of said support means, and means for determining said initial position of the arm, comprising a stop member, and a latch element projecting from said sound head structure and engageable with said stop member to effect a predetermined pivotal position of the sound head structure relative to the arm, a record provided with a first or entering groove, said stop element being so positioned with respect to the entering groove of said record so as to locate the arm and sound head structure in sound head latching position such that the needle will be in overlying alignment with the first or entering groove of a record in lowered position prior to play thereof, the needle engaging in said entering groove upon elevation of the record to playing position, and the record in its elevation to playing position, effecting through said needle a pivotal lift of said sound head structure to release said latch element from said stop member, whereby to free the tone arm assembly for record play.

2. In a phonograph having a tone arm shaft, tone arm assembly for cooperation with a sound record of the disc type, said assembly comprising an arm supported at one end on said shaft for horizontal movement over the playing surface of the record at a relatively constant elevation thereover, the shaft support of the arm at said one end thereof including a bracket fixed to the shaft and a pivotal connection between the bracket and said one end of the arm, said arm providing an open-bottom recess in its opposite end, a sound head assembly positioned in the arm recess and having a record-engaging needle near one end thereof, said sound head assembly including a sound head mounting bracket and weight members thereon, pivot means mounted in said arm for pivotally supporting said sound head mounting bracket with said weight members and sound head thereon, such that a predetermined major portion of the sound head assembly is on one side of the pivot means, thereby determining in accordance with the weight of such major portion of the sound head assembly, the record bearing pressure of the needle, adjustable weight means on the sound head mounting bracket by which the weight of said major portion of the sound head assembly may be altered, and adjustable means in engagement with said arm in a zone thereof between said pivotal connection and said pivot means, for adjustably determining the elevation of the arm assembly over the playing surface of the record.

SLINGSBY D. HARMAN.

References Cited in the file of this patent

UNITED STATES PATENTS

| Number | Name | Date |
|---|---|---|
| 884,963 | Valiquet | Apr. 14, 1908 |
| 1,266,767 | Brosius | May 21, 1918 |
| 1,662,584 | Moccia | Mar. 13, 1928 |
| 2,060,117 | Proctor | Nov. 10, 1936 |
| 2,113,401 | Goldsmith | Apr. 5, 1938 |
| 2,222,552 | Dally | Nov. 19, 1940 |
| 2,230,865 | Hutter | Feb. 4, 1941 |
| 2,243,698 | Freborg et al. | May 27, 1941 |
| 2,244,506 | Staszkiewiecz | June 3, 1941 |
| 2,287,809 | Leonard | June 30, 1942 |
| 2,295,904 | Kurkjian | Sept. 15, 1942 |
| 2,331,122 | Jones | Oct. 5, 1943 |
| 2,375,658 | Johnson | May 8, 1945 |
| 2,376,741 | Weaver | May 22, 1945 |
| 2,387,916 | Knox et al. | Oct. 30, 1945 |
| 2,455,466 | Brubaker | Dec. 7, 1948 |
| 2,485,137 | Brown et al. | Oct. 18, 1949 |
| 2,506,665 | Giovannucci | May 9, 1950 |

FOREIGN PATENTS

| Number | Country | Date |
|---|---|---|
| 64,045 | Denmark | Oct. 22, 1945 |